United States Patent [19]

Galasso et al.

[11] 4,026,677

[45] May 31, 1977

[54] HIGH TEMPERATURE TITANIUM BRAZE FOIL

[75] Inventors: Francis S. Galasso, Manchester; Urban E. Kuntz, East Hartford; Eugene J. Delgrosso, Wallingford, all of Conn.

[73] Assignee: United Technologies Corporation, Hartford, Conn.

[22] Filed: Feb. 13, 1975

[21] Appl. No.: 549,848

[52] U.S. Cl. .............................. 428/649; 428/660; 228/195

[51] Int. Cl.² ........................................ B32B 15/00

[58] Field of Search .............. 29/194, 198; 228/195

[56] References Cited

UNITED STATES PATENTS

| | | | |
|---|---|---|---|
| 2,906,008 | 9/1959 | Boegehold et al. | 29/194 |
| 3,038,249 | 6/1962 | Gilliland et al. | 29/194 X |
| 3,148,038 | 9/1964 | Wolfe | 29/194 |
| 3,451,792 | 6/1969 | Redden | 29/194 |

*Primary Examiner*—L. Dewayne Rutledge
*Assistant Examiner*—E. L. Weise
*Attorney, Agent, or Firm*—John D. Del Ponti

[57] ABSTRACT

The diffusion brazing of members comprised of materials which are characterized by embrittlement as a result of exposure to excessive temperatures is accomplished with the aid of preforms consisting of a titanium-zirconium alloy foil coated with a plurality of eutectic depressant alloying agents. The depressant agents, in a preferred embodiment, are applied as layers and consist of beryllium and nickel. The preforms are sandwiched between surfaces to be joined and the resulting assemblies are heated in a non-reactive environment with light pressure loading whereby a liquid phase will result and diffusion of metal from the preform into the base metals will occur.

1 Claim, No Drawings

HIGH TEMPERATURE TITANIUM BRAZE FOIL

BACKGROUND OF THE INVENTION

1. Field of the Invention

The present invention relates to diffusion bonding of space age metals, such as titanium and zirconium and their alloys, and particularly to low pressure joining techniques which utilize a eutectic fugitive liquid phase. More specifically, this invention is directed to diffusion brazing and to foil type braze alloy preforms for use therein. Accordingly, the general objects of the present invention are to provide novel and improved methods and materials of such character.

2. Description of the Prior Art

There has been a long standing desire, particularly in the aerospace and nuclear industries, for production techniques applicable to the joining of components comprised of materials such as zirconium, titanium and their alloys. For purposes of explanation, the discussion below will be directed to the joining of members formed from titanium alloys such as Ti-6Al-4V (nominally 6% aluminum, 4% vanadium, balance by weight titanium).

It is well known that, in working with alpha or alpha-beta titanium alloys, temperature must generally be limited to a range below the beta transus. Titanium has two lattice forms; i.e., alpha or hexagonal close packed and beta or body center cubic. In alpha-beta alloys excess amounts of the beta form or transformed beta Ti, which are characterized by embrittlement, will occur if the alloy is subjected to a temperature in excess of the beta transus which, for Ti-6Al-4V, lies in the range of 1790° F to 1850° F; the melting point of Ti-6Al-4V being approximately 3000° F. Thus, titanium and titanium alloys can not be bonded to each other by conventional fusion welding techniques without formation of the beta phase in the weld zone and in part of the heat effected zone. In view of the inability to weld titanium alloys without detrimental property effects, various diffusion bonding processes have been proposed, and in some cases utilized, in the prior art.

The prior art diffusion or braze bonding techniques applicable to titanium and titanium alloys may be generally classified by the form of an intermediate material; i.e., either solid or powder; positioned between the members to be joined. In both cases the intermediate forms a eutectic liquid and bonding is achieved by virtue of an exchange of atoms across the interface between the parts; the liquid metal enhancing the exchange and overcoming mismatch between the facing surfaces at the desired joint. Use of an intermediate which forms a eutectic alloy with the titanium alloy is, of course, highly desirable because it lowers the maximum temperature to which the titanium need be subjected during the bonding process. Thus, to summarize, in prior art diffusion bonding or brazing of titanium and/or titanium alloys an intermediate which forms a eutectic alloy having the lowest possible melting point is selected in the interest of limiting the detrimental property effects associated with the formation and growth of beta phase titanium. Additionally, the intermediate must form, with the titanium and or titanium alloys, ductile joints which are characterized by an absence of continuous interfaces of brittle compounds. Thirdly, the intermediate must be susceptible to storage without deterioration or contamination. In use the intermediate must be capable of placement without undue difficulty, as a thin layer, between the surfaces to be joined. Also, the intermediate should permit the formation of joints which are of consistent quality and are thus reproducible. The intermediate must, of course, be soluble in the base material and the amount of solid state diffusion necessary to form a satisfactory joint should be minimized.

Prior art braze bonding techniques employing solid state preforms have failed to meet one or more of the above-discussed criteria. Thus, for example, brazing processes which have employed silver based alloys as the intermediate have produced joints with poor stress-corrosion resistance.

Prior art brazing techniques utilizing an intermediate in powder form have been characterized by high expense and a severe reproducibility problem. The high expense may be attributed to both the cost of the powder and the difficult manipulative steps associated with spraying or otherwise distributing the powder on the parts to be joined. The lack of reproducibility is most often attributed to contamination, particularly oxidization of the powder, which raises the brazing temperature. Particularly troublesome is the fact that the only way the effect of powder contamination can be detected is by checking bonded joints.

It is especially noteworthy that many prior art intermediates, and particularly the rather well known Ti-Cu-Ni alloys, have required temperatures in the range of 1750° F to 1800° F to achieve a bond. These temperatures are sufficiently high to initiate the formation of the beta phase in Ti-6Al-4V. In an effort to overcome the embrittlement problem inherent in operating in this temperature range resort has often been had to titanium alloys such as Ti-8Al-1Mo-1V which has a higher beta transus than Ti-6Al-4V. However, as is well known, Ti-6Al-4V is less expensive and much easier to shape into the desired part than are other titanium alloys having comparable mechanical and physical property characteristics.

It is also noteworthy that most prior art diffusion bonding techniques, often in an effort to reduce the requisite temperature, have called for the application of considerable pressure across the desired joint. The necessity of applying high pressure is a substantial deterent to utilization of these techniques in production in view of the size and expense of the presses required.

SUMMARY OF THE INVENTION

The present invention overcomes the above briefly discussed and other deficiencies and disadvantages of the prior art by providing a novel alloy in foil form which may be positioned, as a braze preform, between the surfaces to be joined. The preform in accordance with a preferred embodiment of the invention consists of a titanium-zirconium foil which is coated on both sides with at least a pair of eutectic depressant alloying agents. In one reduction to practice the depressant agents were beryllium and nickel.

Employing the preforms of the present invention, positioned between surfaces to be joined, light pressure loading is applied and the assembly consisting of the joints and foil preform is heated in a vacuum or suitable nonreacting atmosphere to a temperature above the initial eutectic temperature of the preform but below 1700° F. Upon heating, the depressant materials will form, with the Ti-Zr foil, a low melting point eutectic which will fill the gaps between the surfaces to be joined. With extended isothermal heating, diffusion of metal from the preform into the base metal will be promoted. Subsequently, all liquid will solidify and a strong solid joint will be formed.

DESCRIPTION OF THE PREFERRED EMBODIMENTS

In accordance with the present invention, a thin interlayer alloy is placed between the surfaces to be bonded. The assembly, with the surfaces held together by application of pressure preferably in the range of 2 to 100 psi, is heated to the bonding temperature to melt the interlayer and fill the gaps between the surfaces. The bonding temperatures employed in accordance with the invention are above approximately 1550° F but below the beta transus; i.e., the bonding temperatures will be in the range of 1625° F ± 75° F. The assembly is held at temperature, or heat treated, to promote rapid interdiffusion and the heating may continue so that the joint will solidify isothermally.

The interlayer alloy in accordance with the present invention will consist of a titanium-zirconium foil to which a eutectic depressant alloying agent has been added. The preferred foil, which can be obtained from commercial sources, will be rolled in the range of 4 to 5 mils thick and will comprise Ti-(50 ± 6) Zr; the amounts being given in percent by weight. Although coating on a single side is possible, the foil will preferably be coated on both sides with the eutectic depressant alloying agent and the "sandwich" thus formed placed between the surfaces to be bonded. Upon heating, the depressant will form, with this foil, a low melting point eutectic that will fill the gaps between the surfaces to be joined. With extended isothermal heating, diffusion into the base metal will occur and all liquid may solidify to form a solid joint.

It is to be noted that the heating steps discussed above will typically be performed in a vacuum but may also be performed in another type of non-reacting environment such as in inert gas atmosphere, for example in argon, if sufficient safeguards are taken to insure the purity of the gas. It is essential that oxidation of the depressant be prevented by removal of all water vapor and residual gases, especially oxygen, since oxidation will raise the brazing temperature toward the beta transus.

Continuing with a discussion of the interlayer material, a particular advantage of the present invention is that the titanium-zirconium foil can be stored for use at any desired time and will typically be coated with the depressant at the time of use. In use the depressant will partially alloy with and then migrate into the foil and the work pieces which are being joined. After formation of the eutectic fugitive liquid phase the temperature may be raised, for example from 1600° F to 1625° F, to promote interdiffusion and possibly isothermal solidification. A second approach is to perform the entire heating step at a single temperature above the initial eutectic temperature, for example 1625° F, to promote melting, interdiffusion and possibly subsequent isothermal solidification.

In one reduction to practice the eutectic depressant alloying agent was beryllium. Successful tests have been employed utilizing a rolled Ti-Zr alloy foil having a thickness of 5 mils. The foil was sandwiched between two layers of Be foil having a thickness of one mil. Thereafter, the Be - (Ti+Zr) sandwich was placed between two Ti-6Al-4V parts in a vacuum, a pressure of 5 psi was applied and the assembly was heated. The heating step consisted of one hour at 1600° F. The strength of the resulting bond, measured by a tensile mechanical test, was 20,000 psi. This bond strength is equivalent to a 20,000 psi ultimate tensile strength and is satisfactory for many applications.

In view of the rather substantial expense of Be foil, it is preferred to coat the Ti-50Zr foil on both sides with a thin layer of Be, in the range of 0.1 to 0.2 mils thickness, by means of sputtering in a vacuum. In one reduction to practice the titanium-zirconium foil was coated by sputtering with Be; 6% weight addition to the foil being achieved. The interlayer "sandwich" was placed between two Ti-6Al-4V parts and a pressure of 5 psi applied. The structure was heated, in a vacuum, at 1600° F for 0.5 hours whereby the Be partially alloyed with and migrated into the foil and titanium alloy parts. Thereafter, the temperature was raised to 1625° F and held at this level for a period of 8 hours. Examination of the joints that formed indicated that sufficient diffusion occurred so that the interlayer member was no longer clearly discernible and little intermetallic formation occurred. Tensile stress tests on the joints indicated a resulting bond strength of 13,000 psi.

In accordance with a further reduction to practice, nickel was employed as the eutectic depressant. Again employing a 5 mil thick rolled Ti-50Zr foil, nickel was applied to both sides thereof in a thickness of 0.5 to 1.0 mils; i.e., the nickel was applied to the foil until it constituted a weight percent in the range of 2.5% to 38.5%; 8% to 24% nickel being preferred. The nickel coating is preferably applied to the Ti-Zr foil by electroplating. The nickel, of course, may be coated in other ways such as by sputtering, plasma spraying, bonding a nickel foil to the Ti-Zr foil, etc.

In a specific example of the latter bonding technique, two parts comprised of Ti-6Al-4V were bonded together using a Ti-45Zr-10Ni interlayer preform, the interlayer material having been formed by electroplating nickel on a Ti-50Zr foil. The interlayer was sandwiched between the parts and a pressure of 5 psi applied. The sample was exposed to a temperature of 1550° F in a vacuum for ¼ hour during which time the interlayer melted and nickel from the liquid eutectic penetrated the parts. Thereafter, with the pressure still employed and still under the vacuum, the temperature was raised to 1625° F for eight hours.

An alternative technique has been to sandwich the Ti-45Zr-10Ni interlayer between the titanium alloy parts, apply a pressure of 5 psi, draw a vacuum and heat directly to 1625° F and hold for 8 hours; the same joint strength being obtained. Stress rupture data on bonds formed employing this alternative technique were obtained and compared with baseline data for a one inch diameter Ti-6Al-4V bar; the baseline rupture data for failure being 100 hours at 850° F and 65 ksi. This stress rupture data is as follows:

SAMPLE 1

144 hours at 35 ksi
+ 168 hours at 50 ksi
+ 0.1 hours at 58.5 ksi

SAMPLE 2

240 hours at 55 ksi
96+ hours at 58 ksi

SAMPLE 3

216 hours at 55 ksi 504 hours at 60 ksi
27.7 hours at 62 ksi

It is to be noted that Samples 2 and 3 clearly indicate that the behavior of joints fabricated in accordance with the present invention approach that of the raw titanium alloy. Sample 3 is noteworthy in that the specimen failed outside of the joint.

The interlayer preform utilizing nickel as the depressant may also be produced by rolling a Ti-Zr-(10-18)Ni alloy into a foil. Regardless of the manner in which the nickel is added to the interlayer material, tests have shown that up to 38.5% nickel by weight can be employed. Using a Ti-Zr-Ni foil in which the electroplated nickel was in the range of 11% to 18% by weight, 2-Ti-6Al-4V parts have been bonded together with a resulting bond tensile strength of 132 ksi. The times at temperature have also been varied within the range of 1–8 hours. Bond tensile strengths up to 110 ksi have been obtained with two hours at temperature.

In accordance with another reduction to practice the interlayer was comprised of a Ti-Zr foil with a coating of Be and Ni. The addition of small amounts of nickel to the beryllium coated Ti-Zr foil lowers the melting point of the interlayer and permits the use of smaller amounts of the comparatively expensive Be. A Ti-Zr-Be-Ni interlayer may be fabricated by plating a small amount of nickel onto a Ti-50Zr foil and thereafter packing the plated foil in beryllium powder which is heated to the Ti-Zr-Be-Ni eutectic temperature; i.e., the beryllium powder is pack fused over the nickel. Thereafter, the sheet is washed to remove loosely adhering beryllium and rolled to produce a flat surface.

The interlayer preform is then completed by plating more nickel to further reduce the melting point. In a typical example the interlayer, in percent by weight, will comprise the four constituent materials within the following ranges:

Ti = 46 to 37%
Zr = 46 to 37%
Be = 2 to 6%
Ni = 4 to 24%

Using a Ti-43Zr-2 Be-10Ni foil, two Ti-6Al-4V alloy parts were joined in a vacuum with an applied pressure of 5 psi. The heating step consisted of heating to 1625° F and holding for eight hours. The melting point of the interlayer was 1500°–1525° F and the strength of the resulting bond was 44 ksi.

While preferred embodiments have been described above, various modifications and substitutions may be made thereto without departing from the spirit and scope of the invention. Thus, it is to be understood that the present invention has been described by way of illustration and not limitation.

What is claimed is:

1. A composite preform for use in diffusion brazing comprising:
   a titanium-zirconium foil;
   at least a first layer of nickel coated on at least a first surface of said foil; and
   a coating of beryllium formed over said nickel layer, the total preform composition consisting essentially of, by weight, 37–46% titanium, 37–46% zirconium, 2–6% beryllium and 4–24% nickel.

* * * * *